United States Patent
Jamadagni et al.

(10) Patent No.: US 9,467,897 B2
(45) Date of Patent: Oct. 11, 2016

(54) METHOD AND SYSTEM FOR MANAGING A TEMPORARY BLOCK FLOW IN A DATA COMMUNICATION NETWORK ENVIRONMENT

(75) Inventors: Satish Nanjunda Swamy Jamadagni, Bangalore (IN); Sarvesha Anegundi Ganapathi, Bangalore (IN); Jongsoo Choi, Walton on Thames (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 13/575,784

(22) PCT Filed: Jan. 27, 2011

(86) PCT No.: PCT/KR2011/000570
§ 371 (c)(1),
(2), (4) Date: Aug. 28, 2012

(87) PCT Pub. No.: WO2011/093654
PCT Pub. Date: Aug. 4, 2011

(65) Prior Publication Data
US 2012/0320884 A1 Dec. 20, 2012

(30) Foreign Application Priority Data
Jan. 27, 2010 (IN) .............. 190/CHE/2010

(51) Int. Cl.
*H04W 28/16* (2009.01)
*H04W 28/10* (2009.01)

(52) U.S. Cl.
CPC ................................. *H04W 28/10* (2013.01)

(58) Field of Classification Search
None
See application file for complete search history.

(56) References Cited

U.S. PATENT DOCUMENTS

| 7,054,268 B1 * | 5/2006 | Parantainen ............ H04L 69/32 370/231 |
|---|---|---|
| 2003/0179726 A1 | 9/2003 | Forssell et al. |
| 2007/0201396 A1 | 8/2007 | Hautamaki et al. |
| 2009/0034462 A1 * | 2/2009 | Kalden et al. ................ 370/329 |
| 2010/0210275 A1 * | 8/2010 | Navratil et al. .............. 455/450 |

* cited by examiner

*Primary Examiner* — Rhonda Murphy
(74) *Attorney, Agent, or Firm* — Jefferson IP Law, LLP

(57) ABSTRACT

The present invention provides a method and system for managing temporary block flow in a data communication network environment. In one embodiment, a temporary block flow is established between the first entity and the second entity. Then, it is determined whether the established TBF is to be maintained for a predetermined time period by the first entity based on quality of service (QoS) parameters associated with the established TBF. Further, a message indicating that the established TBF is to be maintained for the predetermined time period is sent to the second entity if the established TBF is to be maintained. Also, the established TBF between the first entity and the second entity is extended in uplink or delayed in downlink. If the established TBF is not to be maintained, the TBF established between the first entity and the second entity is teared down.

17 Claims, 3 Drawing Sheets

Fig. 5A

```
                            Bit
      8      7      6      5      4      3      2      1     Octet
   |   TFI     |      Countdown Value       |   SI  |  R  |    1
   |        BSN1           |           TFI              |    2
   |   BSN2   |            BSN1                         |    3
   |                      BSN2                          |    4
   |Spare| PI |  RSB |            CPS                   |    5
   |            Spare                        |   ETAI  |    6
```

Fig. 5B

```
                            Bit
      8      7      6      5      4      3      2      1     Octet
   |   TFI     |      Countdown Value       |   SI  |  R  |    1
   |        BSN1           |           TFI              |    2
   |   BSN2   |            BSN1                         |    3
   |                      BSN2                          |    4
   |PANI | PI |  RSB |            CPS                   |    5
   |            Spare                        |   ETAI  |    6
```

METHOD AND SYSTEM FOR MANAGING A TEMPORARY BLOCK FLOW IN A DATA COMMUNICATION NETWORK ENVIRONMENT

TECHNICAL FIELD

The present invention relates to data communications, and more particularly relates to method and system for managing temporary block flow (TBF) in a data communication network environment.

BACKGROUND ART

In data communication network such as EGPRS or GPRS, a link layer protocol context is established between two network entities (e.g., user equipment and base station) for data transmission. This link layer protocol context is called Temporary Block Flow (TBF) in GPRS and EGPRS. If a TBF has been established, a scheduler assigns necessary radio resources for transmitting data streams. Once the data streams are transmitted, the TBF may be cancelled by the UE and the base station. The setting up and tearing down of the TBF is conventionally controlled by the number of data streams to be transmitted.

Typically, upon transmission of one or more data streams, the TBF may be relinquished with the intention to free up the assigned resources assuming that no more data streams are pending for transmission. For example, in case of interactive class application, there may be a new set of data streams pending for transmission after a short period of time (<5 seconds). In such case, the TBF is set up again for transmitting the new set of data streams. It can be noted that, setting up and tearing down of the TBF requires a large amount of signalling between the two network entities and thus there may be quite a substantial delay when data streams are to be transmitted and a TBF has not been already established.

Alternatively, the established TBF may be extended or delayed considering that there may be more data streams to be transmitted within a short period of time. In fact, there may be no additional data streams to be transmitted. Since, the TBF is just kept open unconditionally for a considerable duration (i.e. in cases where no data streams need to be transmitted); there may be substantial wastage of UE battery power and network resources.

DISCLOSURE OF INVENTION

Solution to Problem

According to an aspect of the present invention, a method of managing a temporary block flow (TBF) between a first entity and a second entity in a data communication network, comprising: establishing a temporary block flow between the first entity and the second entity; determining whether the established TBF is to be maintained for a predetermined time period by the first entity based on quality of service (QoS) parameters associated with the established TBF; if so, sending a message indicating that the established TBF is to be maintained for the predetermined time period to the second entity by the first entity via the data communication network; and if not, tearing down the TBF established between the first entity and the second entity; is disclosed.

According to another aspect of the present invention, a non-transitory computer-readable storage medium having instructions stored therein, that when executed by one or more entities of a data communication network, result in performing a method of managing a temporary block flow (TBF) between a first entity and a second entity in a data communication network, comprising: establishing a TBF between the first entity and the second entity; determining whether the established TBF is to be maintained for a predetermined time period based on quality of service (QoS) parameters associated with the established TBF by the first entity; if so, sending a message indicating that the established TBF is to be maintained for the predetermined time period to the second entity by the first entity via the data communication network; and if not, tearing down the TBF established between the first entity and the second entity; is disclosed.

According to still another aspect of the present invention, A data communication system comprising: a base station; at least one user equipment; and a data communication network communicatively coupling the base station and the at least one user equipment for managing a temporary block flow (TBF) between the base station and the at least one user equipment, wherein the base station establishes a TBF between the base station and the at least one user equipment, determines whether the established TBF is to be maintained for a predetermined time period based on quality of service (QoS) parameters associated with the established TBF, sends a message indicating that the established TBF is to be maintained for the predetermined time period to the at least one user equipment via the data communication network if the established TBF is to be maintained, and tears down the TBF established between the base station and the at least one user equipment if the established TBF is not to be maintained; is disclosed.

BRIEF DESCRIPTION OF DRAWINGS

FIGS. 5A and 5B illustrate schematic representations of MAC headers indicating extended UL/delayed DL TBF applicability indicator, according to one embodiment.

The drawings described herein are for illustration purposes only and are not intended to limit the scope of the present disclosure in any way.

MODE FOR THE INVENTION

The present invention provides a system and method for managing a temporary block flow in a data communication network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
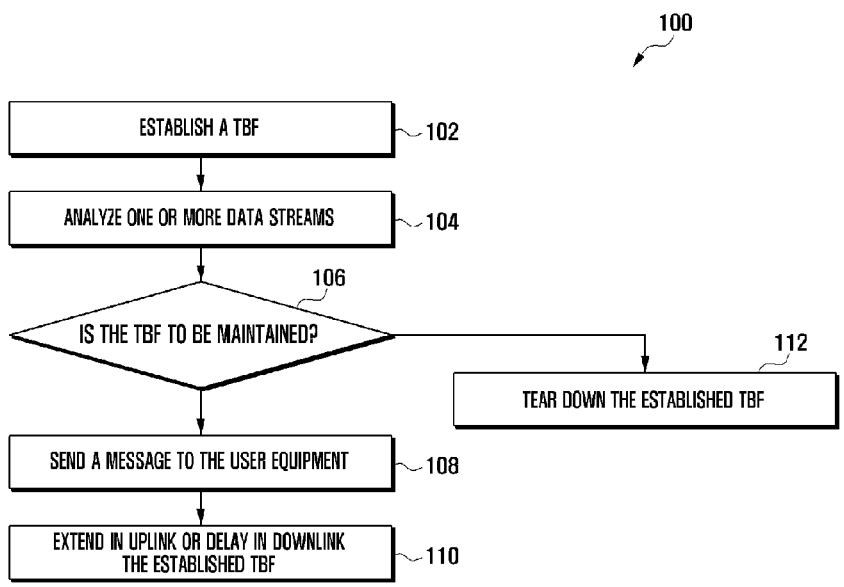
FIG. 1 is a process flowchart of an exemplary method of managing a temporary block flow (TBF) established between a base station and a user equipment, according to one embodiment.

FIG. 1 is a process flowchart 100 of an exemplary method of managing a temporary block flow (TBF) established between a base station and a user equipment, according to one embodiment. At step 102, a TBF is established between the base station and the user equipment for transmission of data streams. At step 104, one or more data streams associated with at least one application of an application type are analyzed based on negotiated QoS parameters. For example, in the Non Access Stratum (NAS) entity, the QoS parameters are negotiated during a Packet Data Protocol (PDP) context establishment. The negotiated QoS parameters may include parameters associated with an application type and a traffic class associated with the one or more data streams. The parameters may include a number of data streams in the buffer, rate of arrival of the data streams, mean inter data streams arrival delay, inter arrival delay between data streams. The application type may be an interactive QoS class application such as web application (e.g., social networking application, periodic update/tickers/advertisement application, Low bandwidth games and so on), E-mail, Voice over Internet Protocol, Push-to-talk, active maps, secured web access, news sites, IM application and so on and a non-interactive QoS class application such as background class application, streaming and real-time QoS class applications.

In one embodiment, the one or more data streams are analyzed by the user equipment (e.g., at a radio link control (RLC) or medium access control (MAC) layer or in any other layers of protocol stack) based on the negotiated QoS parameters. Accordingly, a message indicating applicability of extended uplink or delayed downlink TBF is sent to the base station. For example, the applicability of extended uplink or delayed downlink is indicated through an extended UL/delayed DL TBF applicability indicator in a MAC header of a packet. Exemplary MAC headers 500 and 550 with FANR in deactivated and activated state are illustrated in FIGS. 5A and 5B. In an alternate embodiment, the one or more data streams associated with one or more applications of an application type are analyzed by the base station (e.g., at a SubNetwork Dependent Convergence Protocol (SNDCP)) to determine applicability of extended uplink and delayed downlink TBF. At step 106, it is determined whether the established TBF is to be maintained (extended/delayed) for a predetermined time period by the base station based on the analysis of the one or more data streams.

If the established TBF is to be maintained, then at step 108, a message indicating that the established TBF is to be maintained for the predetermined period of time is sent to the user equipment by the base station via the data communication network. The message may be a packet uplink assignment message, a packet downlink assignment message, packet timeslot reconfiguration message or any other RLC/MAC TBF assignment message. At step 110, the TBF established between the base station and the user equipment is extended in uplink or delayed in downlink. If the established TBF is not to be maintained, then the TBF established between the base station and the user equipment is teared down by the base station, at step 112.

It is understood that, when the TBF is established at step 102, extended uplink or delayed downlink TBF may be enabled by the base station for a given wireless network cell wherein the user equipments associated with the cell and supporting the extended uplink TBF are compelled to follow the extended uplink TBF irrespective of applicability of the extended uplink TBF feature for applications running on the user equipments. In such scenario also, the above steps 104-112 are performed to determined whether the extended uplink TBF is to be maintained or teared down on per user equipment basis.

Moreover, in one example embodiment, a non-transitory computer-readable storage medium having instructions stored therein, that when executed by the base station and/or the user equipment, result in performing a method illustrated in FIG. 1.

Figure 2:
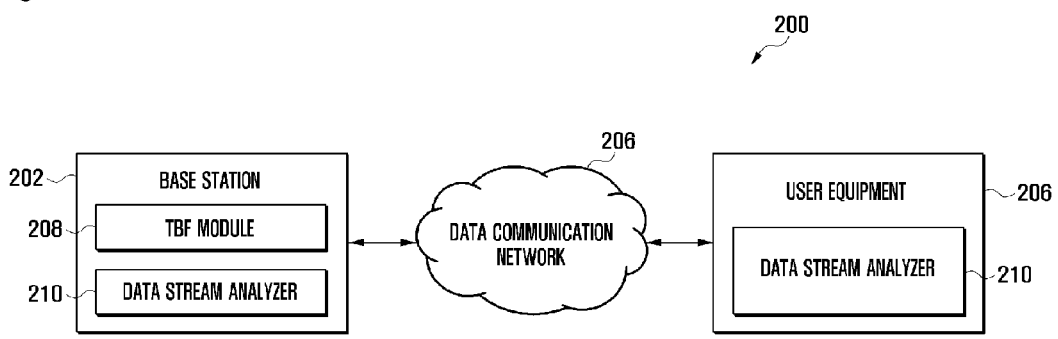
FIG. 2 is a block diagram of a data communication system for managing a TBF established between a base station and a user equipment, according to one embodiment.

FIG. 2 is a block diagram of a data communication system 200 for managing the TBF established between a base station 202 and a user equipment 204, according to one embodiment. In FIG. 2, the data communication system 200 includes the base station 202 and the user equipment 204 communicatively coupled to each other using a data communication network 206. The base station 202 includes a TBF module 208 and a data stream analyzer 210. The user equipment also includes a data stream analyzer 212. In one embodiment, the TBF module 208, the data stream analyzers 210 and 212 may perform one or more above steps described in description of FIG. 1.

Figure 3:
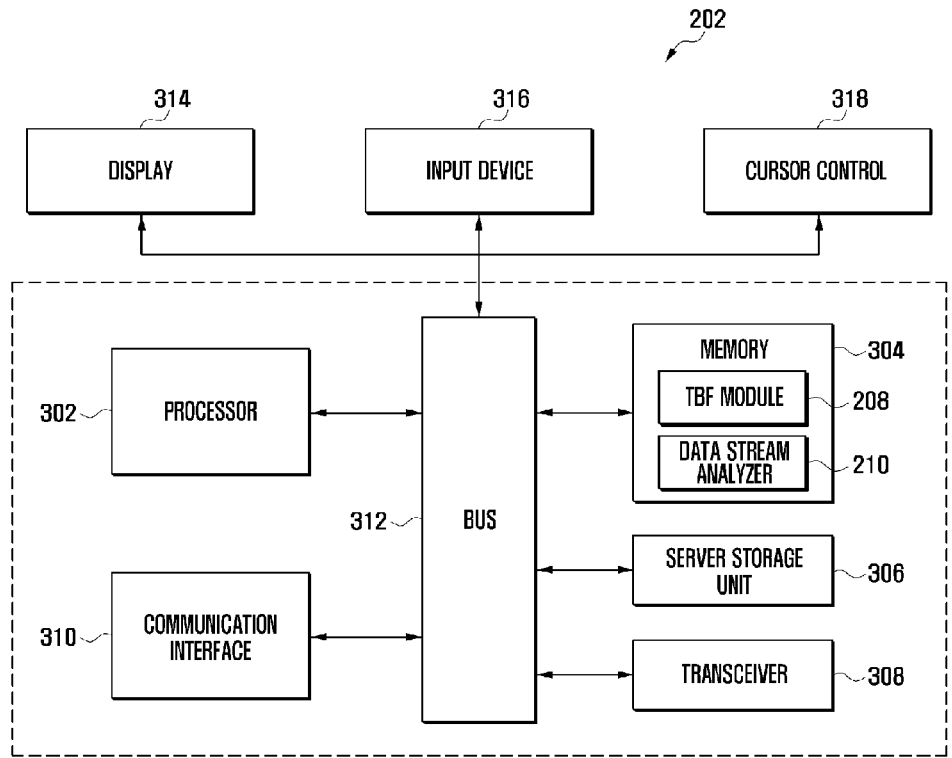
FIG. 3 is a block diagram of the base station showing various components for implementing embodiments of the present subject matter.

FIG. 3 is a block diagram of the base station 202 showing various components for implementing embodiments of the present subject matter. In FIG. 3, the base station 202 includes a processor 302, memory 304, a server storage unit 306, a transceiver 308, a bus 310, a communication interface 312, a display 314, an input device 316, and a cursor control 318.

The processor 302, as used herein, means any type of computational circuit, such as, but not limited to a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 may also include embedded controllers, such as generic or programmable logic devices or arrays, application specific integrated circuits, single-chip computers, smart cards, and the like.

The memory 304 and the server storage unit 306 may be volatile memory and non-volatile memory. The memory 304 includes the data stream analyzer 210 and the TBF module 208 in the form of instructions to analyze one or more data streams associated with one or more applications based on the negotiated QoS parameters and determine whether a TBF is to be extended in uplink/delayed in downlink or teared down based on the results of analysis. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

One can envision that, the method and system described in FIGS. 1 through 4 can also be implemented in data communication networks such as long term evolution (LTE), and UMTS. In case of LTE, the extended UL TBF translates to radio resource connection (RRC connection) and the indicators are indicated in a MAC block or in a MAC header in the UL and in the downlink, it can be indicated in the radio resource assignment messages.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 302. For example, a computer program may include machine-readable instructions capable of managing a TBF in the data communication environment according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the base station 202 to encode according to the various embodiments of the present subject matter.

The transceiver 308 may be capable of receiving applicability of extended UL/delayed DL TBF from the user equipment 204 and sending a message indicating that the TBF is to be maintained. The bus 310 acts as interconnect between various components of the base station 300. The components such as communication interfaces 312, the display 314, the input device 316, and the cursor control 318 are well known to the person skilled in the art and hence the explanation is thereof omitted.

Figure 4:
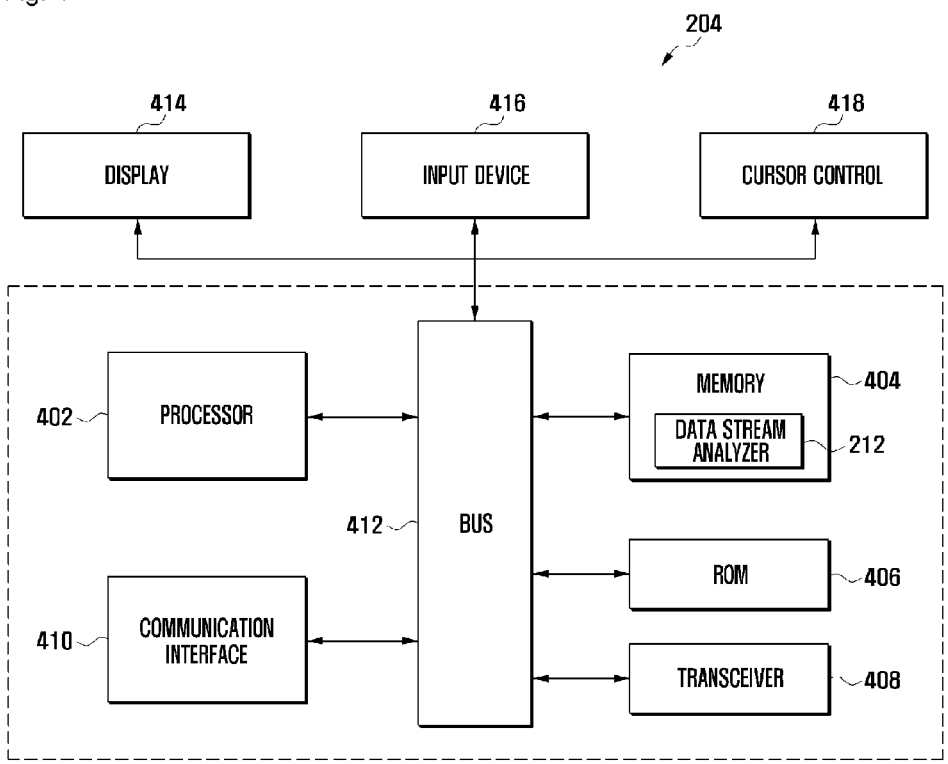
FIG. 4 is a block diagram of the user equipment showing various components for implementing embodiments of the present subject matter.

FIG. 4 is a block diagram of the user equipment 204 showing various components for implementing embodiments of the present subject matter. In FIG. 4, the user equipment 204 includes a processor 402, memory 404, a server storage unit 406, a transceiver 408, a bus 410, a communication interface 412, a display 414, an input device 416, and a cursor control 418.

The processor 402, as used herein, means any type of computational circuit, such as, but not limited to a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, and the like.

The memory 404 and the server storage unit 406 may be volatile memory and non-volatile memory. The memory 404 includes the data stream analyzer 212 in the form of instructions to analyze one or more data streams associated with one or more applications based on the negotiated QoS parameters and communicate applicability of an extended uplink/delayed downlink TBF based on the results of analysis. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 402. For example, a computer program may include machine-readable instructions capable of analyzing one or more data streams based on negotiated QoS parameters and communicating applicability of an extended uplink/delayed downlink TBF based on the results of analysis according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the user equipment 204 to encode according to the various embodiments of the present subject matter.

The transceiver 408 may be capable of communicating applicability of an extended uplink/delayed downlink TBF based on the results of analysis and receiving a message indicating that the TBF has to be maintained from the base station 202. The bus 410 acts as interconnect between various components of the user equipment 204. The components such as communication interfaces 412, the display 414, the input device 416, and the cursor control 418 are well known to the person skilled in the art and hence the explanation is thereof omitted.

With reference to FIGS. 2, 3 and 4, the TBF module 208 establishes a TBF between the base station 202 and the user equipment 204. The data stream analyzer 210 analyzes one or more data streams associated with at least one application of an application type based on negotiated QoS parameters to determine applicability of a delayed DL TBF. It can be noted that, the data stream analyzer 212 in the user equipment 204 may analyze one or more data streams associated with at least one application of an application type based on negotiated QoS parameters. In such case, the data stream analyzer 212 sends a message indicating applicability of extended UL TBF to the base station 202. Accordingly, the TBF module 208 determines whether the established TBF is to be maintained for a predetermined time period. The TBF module 208 may send a message indicating that the established TBF is to be maintained for the predetermined time period to the user equipment 204 via the data communication network 206 if the established TBF is to be maintained. If the established TBF is not to be maintained, the TBF module 208 tears down the TBF established between the base station and the user equipment 204.

The below description provides an exemplary scenario for determining whether the established TBF is to be maintained. Typically, values at the base station 202 for extended UL TBF timer varies from 3-5 sec and time taken for a TBF establishment is around 600 ms (assuming two phase access in a General Packet Radio Service (GPRS) system). The overall gains from avoiding extended UL TBF for some applications to achieve resource savings at the base station and power savings at the user equipment 204 can be understood by calculating average application usage time per user and user behavior reflected in average number of ON/OFF periods for such applications.

User behaviour has a major effect on nature of traffic generated by different applications. For a web application, the time between two consecutive web pages is related to 'reading time' of the users. As human perception of time follows a normal distribution in a logarithmic scale, the time between web pages is to be subexponentially distributed (e.g., according to Pareto or Weibull). The time between user's requests is often referred to as the 'thinking time' or 'reading time'. The 'thinking time' can be modelled by a lognormal Weibull exponential. The Weibull distribution is defined as:

$$p(x) = \frac{bx^{b-1}}{a^b} e^{-(x/a)^b}$$

A user's surfing behaviour can be described by ON/OFF process. Specifically, an active user stays in either ON period or OFF period at a time and periods alternate until the user session ends. A user request for a web page marks beginning of an ON period. The ON period ends when the web page is completely downloaded and the web page is rendered on the user's computer screen. A web page may be composed of more than one file, in particular, containing HTML file and embedded web objects such as images and scripts. As a result, ON period can be further divided into transfer times of all the web objects that constitute the web page. An active OFF time following transfer of each web object, models lump sum of all the processing overhead, including establishing TBF connection, parsing the HTML file, rendering objects on screen and so on. The OFF period, termed as inactive OFF time as opposed to active OFF time, models time when the user consumes web page after the web page is available to the user. During this time, the user reads the web page and may think for a while before clicking a hyperlink or issues a new URL requesting for next web page which ends the OFF period and starts the next ON period and the process repeats.

It is observed that, about 25% of the time the user thinking time is <5 sec which is upper bound for the inactive period in the extended UL TBF. This means that 75% of the time the user thinking time is greater than 5 sec, where the benefits of the extended UL TBF may not apply.

For a class of typical smart phone applications, about 30% of the time the user thinking time is <5 sec for three applications out of the five applications. This means that 70% of the times the user thinking time is greater than 5 sec for most of the applications and hence the benefits of the Extended UL TBF will not apply. It has to be understood that the analysis provides a trade-off point for opting for signaling overhead due to TBF reestablishment and the resource wastage due to applied Extended UL TBF.

INDUSTRIAL APPLICABILITY

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of managing a temporary block flow (TBF) between a first entity and a second entity in a data communication network at the first entity, comprising:

establishing a temporary block flow between the first entity and the second entity;

determining, by the first entity, whether the established TBF is to be maintained for a predetermined time based on a quality of service (QoS) parameter associated with the established TBF and a calculated usage time of an application related to the established TBF;

transmitting, by the first entity, information indicating that the established TBF is to be maintained for the predetermined time to the second entity via the data communication network if it is determined that the established TBF is to be maintained for the predetermined time; and initiating, by the first entity, the release of the TBF established between the first entity and the second entity if it is determined that the established TBF is not to be maintained for the predetermined time, wherein the information indicating that the established TBF is to be maintained is included in at least one of a packet downlink assignment message, a packet uplink assignment message, and a packet timeslot reconfiguration message, and wherein the predetermined time is identified based on an application type related to the established TBF, an average usage time corresponding to the application, and an average number of on and off periods corresponding to the application.

2. The method of claim 1, further comprising:
extending in uplink or delaying in downlink the established TBF by the first entity and the second entity.

3. The method of claim 1, wherein the QoS parameter is at least one of the application type of the established TBF and a traffic class of the established TBF.

4. The method of claim 3, wherein the application type is an interactive QoS class application and a non-interactive QoS class application.

5. The method of claim 4, wherein determining whether the established TBF is to be maintained for the predetermined time based on the QoS parameter associated with the established TBF comprises:

receiving, by the first entity, an analysis of one or more data streams associated with at least one application of the application type based on QoS parameters; and determining, by the first entity, whether the established TBF is to be maintained for the predetermined time based on the analysis of the one or more data streams from the second entity.

6. The method of claim 5, wherein the first entity is a base station and the second entity is a user equipment.

7. A non-transitory computer-readable storage medium having instructions stored therein, that when executed by one or more entities of a data communication network, result in performing a method of managing a temporary block flow (TBF) between a first entity and a second entity in a data communication network, comprising:

establishing a TBF between the first entity and the second entity;

determining, by the first entity, whether the established TBF is to be maintained for a predetermined time based on a quality of service (QoS) parameter and a calculated usage time of an application associated with the established TBF;

transmitting by the first entity, information indicating that the established TBF is to be maintained for the predetermined time to the second entity by the first entity via the data communication network if the first entity determines that the established TBF is to be maintained for the predetermined time; and initiating, by the first entity, the release of the TBF established between the first entity and the second entity if it is determined that the established TBF is not to be maintained for the predetermined time, wherein the information indicating that the established TBF is to be maintained is included in at least one of a packet downlink assignment message, a packet uplink assignment message, and a packet timeslot reconfiguration message, and wherein the predetermined time is identified based on an application type related to the established TBF, an average usage time corresponding to the application, and an average number of on and off periods corresponding to the application.

8. The storage medium of claim 7, wherein the method further comprises:

extending in uplink or delaying in downlink the established TBF by the first entity and the second entity.

9. The storage medium of claim 7, wherein the QoS parameter is at least one of the application type of the established TBF and a traffic class of the established TBF.

10. The storage medium of claim 9, wherein the application type is an interactive QoS class application and a non-interactive QoS class application.

11. The storage medium of claim 10, wherein the instructions to determine whether the established TBF is to be maintained for the predetermined time based the on QoS parameter comprises:

receiving, by the first entity, an analysis of one or more data streams associated with at least one application of the application type based on QoS parameters; and determining, by the first entity, whether the established TBF is to be maintained for the predetermined time based on the analysis of the one or more data streams from the second entity.

12. The storage medium of claim 11, wherein the first entity is a base station and the second entity is a user equipment.

13. A data communication system comprising:

a base station;

at least one user equipment; and a data communication network communicatively coupling the base station and the at least one user equipment for managing a temporary block flow (TBF) between the base station and the at least one user equipment, wherein the base station is configured to:

establish a TBF between the base station and the at least one user equipment, determine whether the established TBF is to be maintained for a predetermined time based on a quality of service (QoS) parameter associated with the established TBF and a calculated usage time of an application related to the established TBF, transmit information indicating that the established TBF is to be maintained for the predetermined time to the at least one user equipment via the data communication network if it is determined that the established TBF is to be maintained, and initiate release of the TBF established between the base station and the at least one user equipment if it is determined that the established TBF is not to be maintained, wherein the message indicating that the established TBF is to be maintained is selected from the group consisting of a packet downlink assignment message, a packet uplink assignment message, and a packet timeslot reconfiguration message, and wherein the predetermined time is identified based on an application type related to the established TBF, an average usage time corresponding to the application, and an average number of on and off periods corresponding to the application.

14. The system of claim 13, wherein the base station extends in uplink or delays in downlink the established TBF.

15. The system of claim 13, wherein the QoS parameter is at least one of the application type of the established TBF and a traffic class of the established TBF.

16. The system of claim 15, wherein the application type is an interactive QoS class application and a non-interactive QoS class application.

17. The system of claim 16, wherein the base station is further configured to:

receive an analysis of one or more data streams associated with at least one application of the application type based on QoS parameters from the at least one user equipment, wherein the determination of whether the established TBF is to be maintained for the predetermined time is based on the analysis of the one or more data streams from the at least one user equipment.

* * * * *